United States Patent [19]

Legras

[11] Patent Number: 5,651,285

[45] Date of Patent: Jul. 29, 1997

[54] LIQUID LEVEL SENSOR HAVING A PLUNGER CORE

[75] Inventor: Olivier Legras, Asnieres les Bourges, France

[73] Assignee: Auxitrol, S.A., France

[21] Appl. No.: 429,128

[22] Filed: Apr. 26, 1995

[30] Foreign Application Priority Data

Apr. 26, 1994 [FR] France ................... 94 04993

[51] Int. Cl.⁶ ................................. G01F 23/00
[52] U.S. Cl. ........................ 73/290 V; 73/290 R
[58] Field of Search .................. 73/1 DV, 290 V; 137/392

[56] References Cited

U.S. PATENT DOCUMENTS

| | | |
|---|---|---|
| 3,825,025 | 7/1974 | Samuel et al. . |
| 4,101,865 | 7/1978 | Schurr .................... 73/290 V |
| 4,299,114 | 11/1981 | Silvermetz et al. ............ 73/10 V |
| 4,320,659 | 3/1982 | Lynnworth et al. ............ 73/290 V |
| 4,890,490 | 1/1990 | Telford .................... 73/290 V |
| 5,031,451 | 7/1991 | Webster .................... 73/290 V |
| 5,099,454 | 3/1992 | Dieulesaint et al. . |

FOREIGN PATENT DOCUMENTS

| | | |
|---|---|---|
| 0355038 | 2/1990 | European Pat. Off. . |
| 0409732A1 | 1/1991 | European Pat. Off. . |
| 2650073 | 1/1991 | France . |
| 2743862 | 3/1978 | Germany . |

*Primary Examiner*—Richard Chilcot
*Assistant Examiner*—Ronald Biegel
*Attorney, Agent, or Firm*—Bacon & Thomas

[57] ABSTRACT

The liquid level sensor comprises a graduated tape or cable whose free end is fixed to a plunger core that includes a housing and a probe for detecting the presence of a liquid. The probe comprises a metal waveguide having a cylindrical solid top portion, a portion of smaller section constituting a mechanical amplifier, a frustoconical portion, and a cylindrical bottom end portion constituting the sensitive portion of the probe. The metal waveguide is connected to the housing of the plunger core in sealed manner via a support flange which is fixed to the conical portion of the metal waveguide in such a manner that only the portion of the waveguide situated beneath the fixing zone emerges from the housing and can come into contact with a liquid. A transducer electrically powered by electronic processing circuits is disposed at the free end of the top portion and is excited at a predetermined frequency $f_i$ to create incident elastic waves in the waveguide.

19 Claims, 2 Drawing Sheets

FIG. 1
FIG. 2
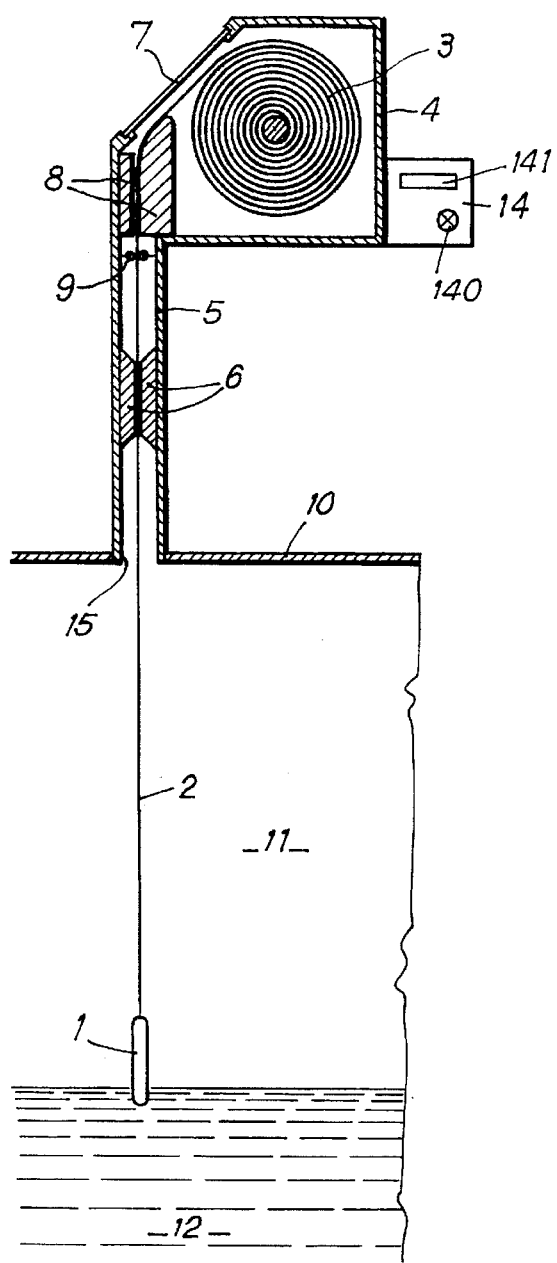
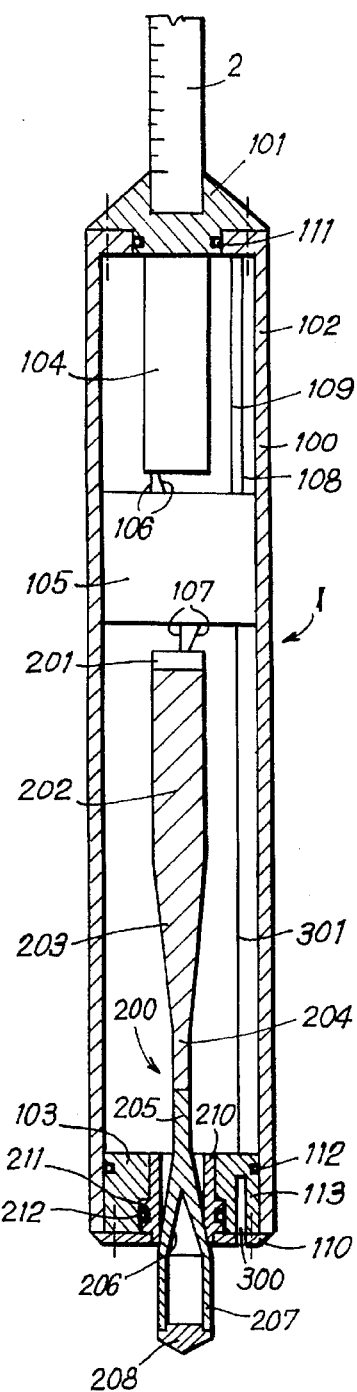

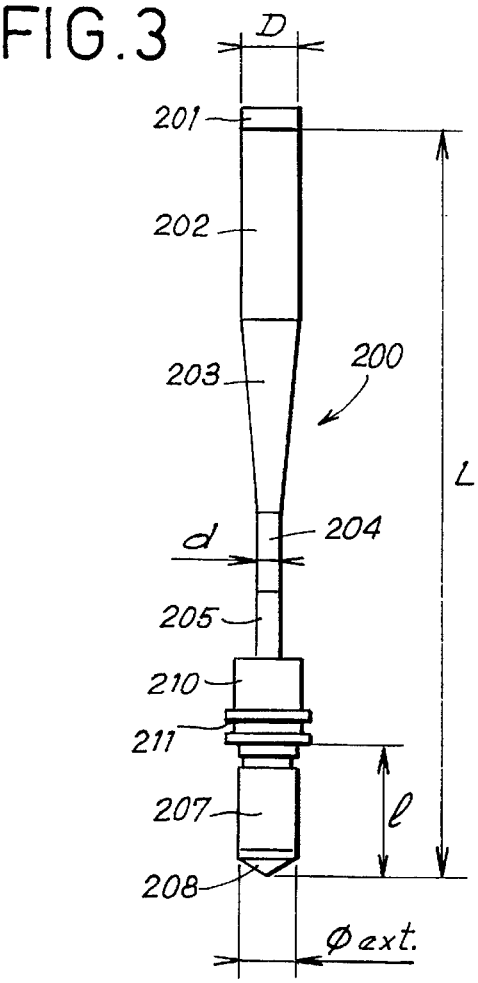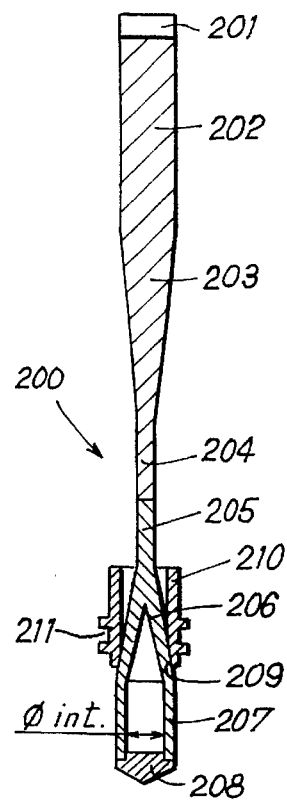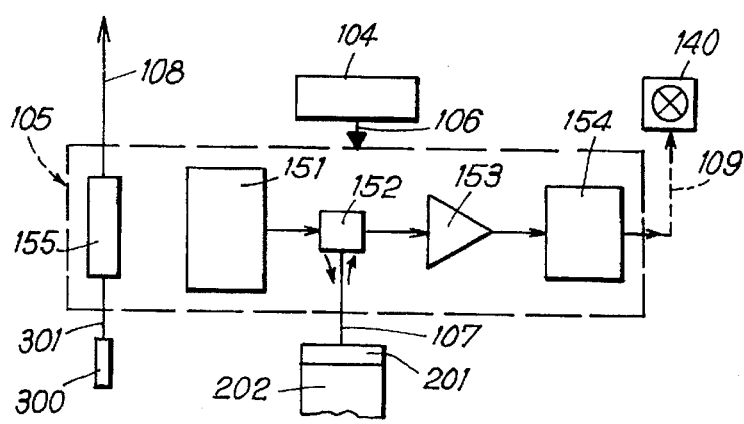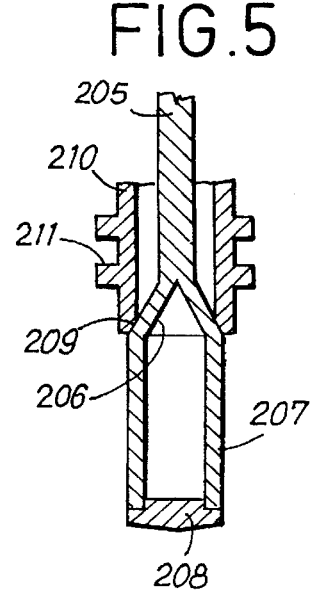

LIQUID LEVEL SENSOR HAVING A PLUNGER CORE

FIELD OF THE INVENTION

The present invention relates to a sensor for sensing the level of a liquid by means of a plunger core, the sensor comprising a plunger core provided with means for detecting the presence of a liquid and a graduated tape or cable windable onto a support disposed outside the receptacle containing the liquid whose level is to be detected, the free end thereof being secured to the housing of the plunger core, which housing incorporates a self-contained electrical power supply, electronic processing circuits, and a probe for detecting the presence of a liquid.

BACKGROUND OF THE INVENTION

This type of liquid level sensor having a plunger core is already known in which the graduated flexible metal tape that is windable into a sealed storage housing outside the tank penetrates into the tank through a passage provided with means for sealing relative to the outside environment. The free end of the tape is fixed to a plunger core which is provided with a detection feeler for detecting the presence of liquid and with means for sending an information signal to a receiver situated outside the tank and provided, for example, with an indicator light that lights up when the detection feeler comes into contact with a liquid. The operator thus causes the graduated tape to be paid out until observing that the indicator lamp is in a boundary region between switching on and switching off, which means that the detection feeler of the plunger core is situated at the interface between a gaseous atmosphere and the liquid. When the indicator light indicates that the detection feeler has reached the interface which it is to find, then the operator observes the graduation on the tape as situated adjacent a reference mark formed in an observation window, which graduation provides an indication of the position of the interface that is to be checked, i.e. an indication of the level of the liquid in the tank.

In practice, in industry, liquid level sensors using plunger cores are used for detecting liquids of a wide variety of types, some of which can be highly aggressive, chemically. At present, each sensor is adapted to a liquid of a particular kind and is therefore not universal. Thus, for certain types of liquid, a detection feeler is used that responds to variations in conductivity, whereas for other types of liquid a detection feeler is used that is of the capacitive type, and for yet other types of liquid, a detection feeler is used that is of an optical type. In addition, optical or capacitive type detectors are somewhat fragile and therefore difficult to use.

Also known are liquid presence detectors of the type based on waveguides for elastic waves (or "sound"). Nevertheless, such detectors are generally rather bulky, of limited sensitivity, and mounted at a fixed station on the wall of the tank containing the liquid.

OBJECTS AND SUMMARY OF THE INVENTION

There thus exists a need to provide a liquid level sensor of the plunger core type that is both sufficiently reliable and sensitive while also being capable of small-sized implementation, with all of the active elements of the sensor being incorporated in the plunger core.

According to the invention, these objects are achieved by a sensor for sensing the level of a liquid by means of a plunger core, the sensor comprising a plunger core provided with means for detecting the presence of a liquid and a graduated tape or cable windable onto a support disposed outside the receptacle containing the liquid whose level is to be detected, the free end of the tape or cable being secured to the housing of the plunger core, which housing incorporates a self-contained electrical power supply, electronic processing circuits, and a probe for detecting the presence of a liquid, wherein the probe for detecting the presence of a liquid comprises a metal waveguide having, in succession: a solid cylindrical top first portion; a second portion of smaller section constituting a mechanical amplifier; a frustoconical third portion whose larger base is at its bottom end; and a cylindrical bottom end fourth portion constituting the sensitive portion of the probe; wherein the metal waveguide is connected to the housing of the plunger core in sealed manner by means of a supporting flange which is fixed on the metal waveguide in a linear annular zone situated level with said frustoconical third portion in such a manner that only the part of the waveguide situated beneath said linear annular zone emerges from the housing of the plunger core and is capable of coming into contact with a liquid; wherein a transducer electrically powered by the electronic processing circuits is disposed at the free end of the top first portion; and wherein the electronic processing circuits comprise circuits for producing excitation pulses of determined frequency $f_i$ that are applied periodically to the transducer to create incident elastic waves in the waveguide, and circuits for detecting pulses delivered by the transducer as echoes of the incident elastic waves in the absence of liquid making contact with the sensitive cylindrical end portion of the waveguide.

In a particular embodiment, the cylindrical end portion of the waveguide is made in tubular form and has a free end that is closed by a plug preventing liquid penetrating into said cylindrical end portion.

According to a particular characteristic, the support flange is fixed on the metal waveguide in a linear annular zone by laser welding or by electron beam welding.

In general, the sensor of the invention has a highly dispersive sensitive portion with small group velocity and large delay for elastic wave trains propagating in the sensitive portion of the waveguide.

The invention makes it possible, in particular, to implement a high sensitivity probe that is very short, less than 1 mm long, while still enabling the use of transducers that can be made from piezoelectric ceramics of usual size.

In a particular embodiment, the smaller section second portion constituting a mechanical amplifier comprises a solid elongate frustoconical first length whose larger base is connected to said solid cylindrical top first portion and a cylindrical second length of smaller diameter connected to the smaller base of the frustoconical third portion.

In this case, in a more particular embodiment that facilitates manufacture, the cylindrical second length of smaller diameter comprises a first part integrally formed with the solid top first portion and with the elongate frustoconical first length, and a second part which is integrally formed with the frustoconical third portion and the bottom cylindrical end portion.

In a particular embodiment, the support flange of the metal waveguide is tubular and includes an outside groove in which an O-ring is received.

Advantageously, the solid cylindrical top first portion and the bottom cylindrical end fourth portion have the same outside diameter.

Preferably, the value of the predetermined frequency $f_i$ expressed in hertz is selected as a function of the outside diameter $\emptyset_{ext}$ and of the inside diameter $\emptyset_{int}$ expressed in meters of the bottom cylindrical tubular end portion, and as a function of the velocity $V_T$ of transverse waves in the material expressed in m/s, on the basis of the following equation:

$$f_i = V_T \times \frac{\emptyset_{ext} - 0.6\emptyset_{int}}{(\emptyset_{ext})^2}$$

The predetermined frequency $f_i$ lies in the range about 100 kHz to about 600 kHz.

The total length of the metal waveguide lies in the range 60 mm to 120 mm.

The length of the cylindrical tubular end portion lies in the range 5 mm to 30 mm.

The outside diameter $\emptyset_{ext}$ of the cylindrical tubular end portion lies in the range 5 mm to 15 mm.

The inside diameter $\emptyset_{int}$ of the cylindrical tubular end portion lies in the range 2 mm to 12 mm.

The cylindrical tubular end portion has a wall whose thickness lies in the range two-tenths of a millimeter to twenty-tenths of a millimeter.

Said cylindrical second length of smaller section has a diameter lying in the range 0.5 mm to 5 mm.

The sensor of the invention may also include a temperature sensor disposed inside the housing of the plunger core.

BRIEF DESCRIPTION OF THE DRAWINGS

Other characteristics and advantages of the invention appear from the following description of particular embodiments, given by way of non-limiting example and described with reference to the accompanying drawings, in which:

FIG. 1 is an overall vertical section view through a liquid level sensor having a plunger core and to which the invention is applicable;

FIG. 2 is an axial section view through one example of a plunger core of a liquid level sensor implemented in accordance with the invention;

FIGS. 3 and 4 are respectively an elevation view and an axial section view of a metal guide and its support made in such a manner as to be incorporated in a plunger core of the invention;

FIG. 5 is a detailed view in axial section showing the connection between the metal waveguide and its support flange; and FIG. 6 is a block diagram showing the essential component elements of the electronic circuits incorporated in a plunger core of the sensor of the invention.

MORE DETAILED DESCRIPTION

FIG. 1 shows an example of a liquid level sensor having a plunger core and to which the invention is applicable. Such a level sensor comprises a plunger core 1 which is inserted via an opening 15 into a tank 10 containing a liquid 12 whose level is to be determined, which liquid 12 is surmounted by a gaseous atmosphere 11. By way of example, the liquid 12 may be water, a petroleum product, or any other type of liquid, including liquids which are highly aggressive, chemically.

The bottom end of the plunger core 1 constitutes the sensitive element. The core 1 has its top end connected to a graduated tape or cable 2 capable of being spiral-wound in a housing 4 located outside the tank 10. The housing 4 defines a leakproof internal volume which is in communication via a channel 5 with the opening 15 formed in the tank 10. The graduated tape or cable 2 carries the plunger core 1 at its free end and passes through the opening 15 into the channel 5 which may contain means 6, 8 for guiding the graduated tape or cable 2, together with means 9 for cleaning the tape or cable 2 before it penetrates into the storage housing 4. A measurement window 7 provided with a reference mark makes it possible at any moment to read the graduation on the tape 2 visible through said window, which graduation serves to define the length of tape or cable 2 situated between the window 7 and the plunger core 1 placed inside the tank 10, and consequently to determine the level of liquid 13 in the tank 10.

To enable the level of liquid 12 in the tank 10 to be determined, the plunger core 1 is fitted with means for sending an information signal to a receiver 14 that is situated outside the tank 10 and that is disposed on one side of the housing 14, for example. These signal-sending means are known per se and may be constituted, for example, by an electromagnetic wave transmission system. The receiver 14 may, for example, include signalling means constituted by an indicator lamp 140 which is activated whenever the sensitive feeler situated at the bottom end of the plunger core 1 comes into contact with the liquid 12. The receiver 14 may also be provided with any other type of display member, e.g. a screen 141.

A particular embodiment of the invention is described in detail below with reference to FIGS. 2 to 6.

FIG. 2 shows that the plunger core 1 comprises a housing 100 having a housing body 102 fitted at its top end with a cover 101 which is connected to the end of a graduated tape 2. The cover 101 is provided with a sealing gasket 111 and serves, in particular, to enable batteries 104 (rechargeable or otherwise) to be inserted into a compartment situated in the top of the plunger core 1.

The plunger core 1 also includes a board or compartment carrying electronic circuits 105 powered from the battery 104 via connection wires 106. The electronic circuits 105 are themselves connected by connection wires 107 to the exciter element 201 of the liquid detection probe 200 situated in the bottom portion of the housing 100 of the plunger core 1.

In accordance with the invention, the probe 200 for detecting the presence of a liquid is of the type having a waveguide for elastic waves and it carries a transducer 201 at its top end, e.g. a transducer of the piezoelectric ceramic type, which transducer constitutes the exciter element that is connected to the electronic circuits 105. The metal waveguide emerges from the bottom portion of the housing 100 in the form of an end portion 207 which constitutes the sensitive portion that is suitable for coming into contact with the liquid 12.

The metal waveguide of the probe 200 is asymmetrical and comprises a top portion 202 that is solid and cylindrical, having a diameter that is large enough to receive a transducer 201 of ordinary size. The cylindrical top portion 202 may thus have a diameter D lying in the range 7 mm to 15 mm, for example, and the diameter may typically be equal to 10 mm.

In order to enable increased energy to be injected while still co-operating with a transducer 201 of ordinary size, the metal waveguide includes a mechanical amplifier 203, 204, 205 which extends the solid cylindrical portion 202 downwards. More particularly, this mechanical amplifier comprises a solid elongate frustoconical length 203 whose larger base is connected to the cylindrical top portion 202, and a cylindrical length 204, 205 of smaller section which extends the frustoconical length 203 downwards, and it is itself extended downwards by a frustoconical portion 206 whose larger base is situated at the bottom thereof.

A cylindrical bottom end portion 207 constituting the sensitive portion of the probe extends the larger base of the frustoconical portion 206 downwards. This cylindrical end portion 207 must be highly dispersive, and that is why it is implemented in tubular form. The free end of this cylindrical end portion 207 is closed by a plug 208 which prevents the liquid penetrating inside the end portion 207, thereby avoiding problems of clogging by particles or waste that might be in suspension in the liquid.

As can be seen in FIGS. 2 and 4, the metal waveguide advantageously includes a solid top first piece made by machining and including the cylindrical top portion 202, the elongate frustoconical length 203, and the top portion 204 of the smaller section cylindrical length, associated with a tubular second piece whose bottom portion defines the tubular end portion 207 and whose top portion tapers so as to define the frustoconical portion 206 and a bottom portion 205 of the smaller section cylindrical length. The portions 204 and 205 may be connected together by welding in such a manner as to avoid impeding the transmission of elastic waves, insofar as said connection is performed in a portion of small section that is remote from the frustoconical portions 203 and 206.

The small section cylindrical length 204, 205 may have a diameter d of about 0.5 mm to 5 mm.

The total length L of the metal waveguide may be very small and may lie in the range about 60 mm to about 120 mm, thereby making it possible to integrate it in a plunger core 1 of small dimensions, having an overall height that can be less than about 200 mm.

The tubular end portion 207 which constitutes the emerging sensitive portion of the housing 100 that may come into contact with the liquid, can have a length l lying in the range 5 mm to 30 mm, an outside diameter $\emptyset_{ext}$ lying in the range about 5 mm to about 15 mm, and an inside diameter $\emptyset_{int}$ lying in the range about 2 mm to about 12 mm. The wall of the tubular end portion 207 may have a thickness lying in the range 0.2 mm to 2 mm.

By way of example, for a metal waveguide having a total length L of 110 mm, the cylindrical tubular end portion 207 may have a length l of 19 mm, an outside diameter $\emptyset_{ext}$ of 8 mm, and an inside diameter $\emptyset_{int}$ of 6.5 mm.

The outside diameter $\emptyset_{ext}$ of the tubular end portion 207 may be equal to the outside diameter D of the solid cylindrical top portion as shown in the drawing, but that is not essential.

The metal waveguide can be made out of various different metals or alloys, e.g. out of brass. However, stainless steel is well adapted to most applications.

According to an important characteristic of the invention, the metal waveguide is connected to the housing 100 via a support flange 210 which is fixed to the metal waveguide in an annular zone 209 which, unlike conventional mounting for waveguides that guide elastic waves, is not situated at the top portion 202 nor even at the mechanical amplifier 203, 204, and 205, but is situated level with the conical linking portion 206, either in a central portion thereof, or even in a portion that may be situated at its boundary with the sensitive cylindrical bottom portion 207, as shown in FIG. 5.

The support flange 210 is advantageously fixed on the conical portion 206 by laser welding or by electron beam welding, which methods guarantee that the resulting connection is both gastight and linear, thereby making it possible to conserve all of the sensitivity of the end portion 207, making it possible for the support to have no influence on the elastic waves transmitted by the waveguide, thereby ensuring that the signal has very good repeatability.

The support flange 210 is tubular and has an outside annular groove 211 in which an O-ring 212 is received. The support flange 210 may be secured in place inside the housing 100, e.g. inside its end plug 113, 110 which is provided with a sealing ring 112 and connected via the bottom end of the side wall 102 of the housing 100.

The electronic processing circuits 105 powered by the electrical supply 104 serve to excite the transducer 201, and are of conventional type, as shown in block diagram form in FIG. 6.

The circuits 105 essentially comprise a wave train generator 151 which applies wave trains via logic gates 152 and a line 107 to the transducer 201, thereby causing elastic waves to be emitted which are transmitted along the metal waveguide to its free bottom end 207, 208.

When the free end 207 is not in contact with a liquid, the wave train emitted by the generator 151 is reflected at the end 208 of the waveguide and causes an echo to appear at the end of the top portion 202, which echo is applied to the transducer 201 and is transmitted in the form of an electrical signal via the logic gates 152 to processor circuits that include an amplifier 152 and a threshold detector member 154 which is associated with means for sending an information signal to a receiver such as the receiver 14 of FIG. 1 which is fitted with an indicator light 140.

In contrast, when the free end 207 comes into contact with a liquid, the echo generated by the free end 208 of the waveguide disappears or is highly attenuated. As a result, the threshold detector circuit 154 detects that the echo has disappeared and gives rise to a change in the signal that is sent to the receiver 14 which is fitted with the indicator means 140. The indicator lamp 140 may be connected so as to be switched on when the portion 207, 208 of the waveguide is in contact with the liquid 12 and so as to be switched off when the portion 207, 208 of the waveguide is in a gaseous atmosphere, or, on the contrary, the lamp 140 may be connected so as to be switched on when the plunger core 1 is in a gaseous atmosphere and to be switched off when the portion 207, 208 of the waveguide comes into contact with the liquid 12.

In the context of the present invention, the probe 200 has a sensitive portion 207, 208 of small dimensions thus making it possible to obtain sensitivity that may be, for example, of the order of 1 mm for detecting the level of a liquid.

The dimensions of the end portion 207 are selected in such a manner as to make it very highly dispersive, thereby making it possible to discriminate between echo signals in such a manner as to enable sensitivity of about 1 millimeter to be achieved. This means that the group velocity of the elastic waves is very small, and consequently that the delay is very large.

In general, the frequency $f_i$ of the excitation wave trains as applied periodically to the transducer 201 by the circuits 151, 152 is selected in such a manner that the elastic wave trains propagate in the mechanical amplifier of the waveguide at the group velocity of the low frequency waves, and in the end tubular portion 207 at the minimum group velocity that corresponds to the point of inflection on the curve of phase velocity as a function of frequency.

The frequency $f_i$ may lie in the range 100 kHz to 600 kHz.

The value of the frequency $f_i$, expressed in hertz, is selected as a function of the outside diameter $\emptyset_{ext}$ and of the inside diameter $\emptyset_{int}$, expressed in meters, of the cylindrical tubular end portion 207, and as a function of the velocity $V_T$ of transverse waves in the material, expressed in meters per second (m/s) on the basis of the following equation:

$$f_i = V_T \times \frac{\emptyset_{ext} - 0.6\emptyset_{int}}{(\emptyset_{ext})^2}$$

When the tubular end portion 207 has a ratio of wall thickness to mean radius a of less than 0.3, the frequency $f_i$ expressed in hertz can be obtained from the mean radius a of said tubular portion, expressed in meters, and from the velocity $V_T$ of transverse waves in the material of said tubular portion, expressed in m/s, using the following equation:

$$f_i = \frac{1.7 \times V_T}{2\pi} \times \frac{1}{a}$$

where $a = (\emptyset_{ext} + \emptyset_{int})/4$.

For a tubular end portion 207 made of stainless steel, the velocity $V_T$ of transverse waves in the material can be taken as being equal to 3150 m/s.

It may be observed that the plunger core 1 of the sensor of the invention may be made in entirely leakproof manner, with the batteries 104 and the electronic circuits 105 being incorporated inside the housing 100, from which there emerges only the sensitive portion 207 of the waveguide for elastic waves. The information provided on the lines 108 and 109 by the electronic circuits 105 can be conveyed to the receiver station 14 located outside the tank 10 by any known means, e.g. transmission by radiowaves, or via a sealed electrical cable secured to the graduated tape or cable 2.

The plunger core 1 designed to be suitable for plunging completely in the liquid 12 may be fitted with additional sensors of known type. Thus, the plunger core 1 may be fitted with a temperature probe 300 connected via links 301 to a processor circuit 155 incorporated in the electronic circuits 105 (FIGS. 2 and 6) and capable of providing temperature information via lines 108 and 109 whenever the plunger core is placed in various different positions within the tank 10. The temperature information may be displayed, for example, by means of the screen 141 of the receiver 14.

The plunger core 1 may also be fitted with a conductivity detector of known type (not shown in the drawings) capable of detecting the presence of various different liquids on the basis of their different conductivities. A plunger core 1 fitted with such a conductivity detector can thus be used, for example, to detect the presence of water at the bottom of a tank 10 that contains hydrocarbons.

Because of its robustness, sensitivity, reliability, and miniaturized immersible sealed plunger core, the level sensor of the invention thus makes it possible to detect with a high degree of accuracy the level of a liquid in a tank, and it makes this possible on a universal basis, given that the same sensor can be used with a wide variety of liquids, while nevertheless enabling various other conventional measurements to be performed such as measurements of temperature or of conductivity.

I claim:

1. A sensor for sensing the level of a liquid by means of a plunger core, the sensor comprising a plunger core and a graduated tape or cable windable onto a support disposed outside a receptacle containing the liquid whose level is to be detected, the free end of the tape or cable being secured to a housing of the plunger core, which housing incorporates a self-contained electrical power supply, electronic processing circuits, and a probe for detecting the presence of a liquid, wherein the probe for detecting the presence of a liquid comprises a metal waveguide having, in succession: a solid cylindrical top first portion; a second portion of smaller section constituting a mechanical amplifier; a frustoconical third portion whose larger base is at its bottom end; and a cylindrical bottom end fourth portion constituting the sensitive portion of the probe; wherein the metal waveguide is connected to the housing of the plunger core in sealed manner by means of a supporting flange which is fixed on the metal waveguide in a linear annular zone situated level with said frustoconical third portion in such a manner that only the part of the waveguide situated beneath said linear annular zone emerges from the housing of the plunger core and is capable of coming into contact with a liquid; wherein a transducer electrically powered by the electronic processing circuits is disposed at the free end of the top first portion; and wherein the electronic processing circuits comprise circuits for producing excitation pulses of determined frequency fi that are applied periodically to the transducer to create incident elastic waves in the waveguide, and circuits for detecting pulses delivered by the transducer as echoes of the incident elastic waves in the absence of liquid making contact with the sensitive cylindrical end portion of the waveguide.

2. A sensor according to claim 1, wherein the cylindrical end portion of the waveguide is made in tubular form and has a free end that is closed by a plug preventing liquid penetrating into said cylindrical end portion.

3. A sensor according to claim 1, wherein the support flange is fixed on the metal waveguide in a linear annular zone by laser welding or by electron beam welding.

4. A sensor according to claim 1, wherein the smaller section second portion constituting a mechanical amplifier comprises a solid elongate frustoconical first length whose larger base is connected to said solid cylindrical top first portion and a cylindrical second length of smaller diameter connected to the smaller base of the frustoconical third portion.

5. A sensor according to claim 4, wherein the cylindrical second length of smaller diameter comprises a first part integrally formed with the solid top first portion and with the elongate frustoconical first length, and a second part which is integrally formed with the frustoconical third portion and the bottom cylindrical end portion.

6. A sensor according to claim 1, wherein the support flange of the metal waveguide is tubular and includes an outside groove in which an O-ring is received.

7. A sensor according to claim 1, wherein the solid cylindrical top first portion and the cylindrical bottom end fourth portion have the same outside diameter.

8. A sensor according to claim 1, wherein the metal waveguide is made of stainless steel.

9. A sensor according to claim 1, wherein the value of the predetermined frequency $f_i$ expressed in hertz is selected as a function of the outside diameter $\emptyset_{ext}$ and of the inside diameter $\emptyset_{int}$ expressed in meters of the cylindrical tubular bottom end portion, and as a function of the velocity $V_T$ of transverse waves in the material expressed in m/s, on the basis of the following equation:

$$f_i = V_T \times \frac{\emptyset_{ext} - 0.6\emptyset_{int}}{(\emptyset_{ext})^2}.$$

10. A sensor according to claim 1, wherein the predetermined frequency $f_i$ lies in the range about 100 kHz to about 600 kHz.

11. A sensor according to claim 1, wherein the total length of the metal waveguide lies in the range 60 mm to 120 mm.

12. A sensor according to claim 1, wherein the length of the cylindrical tubular end portion lies in the range 5 mm to 30 mm.

13. A sensor according to claim 1, wherein the outside diameter $\emptyset_{ext}$ of the cylindrical tubular end portion lies in the range 5 mm to 15 mm.

14. A sensor according to claim 1, wherein the inside diameter $\emptyset_{int}$ of the cylindrical tubular end portion lies in the range 2 mm to 12 mm.

15. A sensor according to claim 1, wherein the cylindrical tubular end portion has a wall whose thickness lies in the range two-tenths of a millimeter to twenty-tenths of a millimeter.

16. A sensor according to claim 4, wherein said cylindrical second length of smaller section has a diameter lying in the range 0.5 mm to 5 mm.

17. A sensor according to claim 1, wherein the cylindrical tubular end portion has a length of 19 mm, an outside diameter $\emptyset_{ext}$ of 8 mm, and an inside diameter $\emptyset_{int}$ of 6 mm, and wherein the total length of the metal waveguide is about 110 mm.

18. A sensor according to claim 1, further including a temperature sensor disposed inside the housing of the plunger core.

19. A sensor according to claim 1, wherein in the event that the tubular end portion has a ratio of wall thickness to mean radius a of less than 0.3, the value of the predetermined frequency $f_i$ expressed in Hz is selected as a function of the mean radius a, expressed in meters, of said tubular portion, and of the velocity $V_T$ of transverse modes in the material of said tubular portion expressed in m/s, on the basis of the following equation:

$$f_i = \frac{1.7 \times V_T}{2\pi} \times \frac{1}{a}$$

* * * * *